June 17, 1947.  A. V. BEDFORD  2,422,334
AUTOMATIC GAIN CONTROL FOR PULSE-ECHO SYSTEMS
Filed Jan. 23, 1943  2 Sheets-Sheet 1
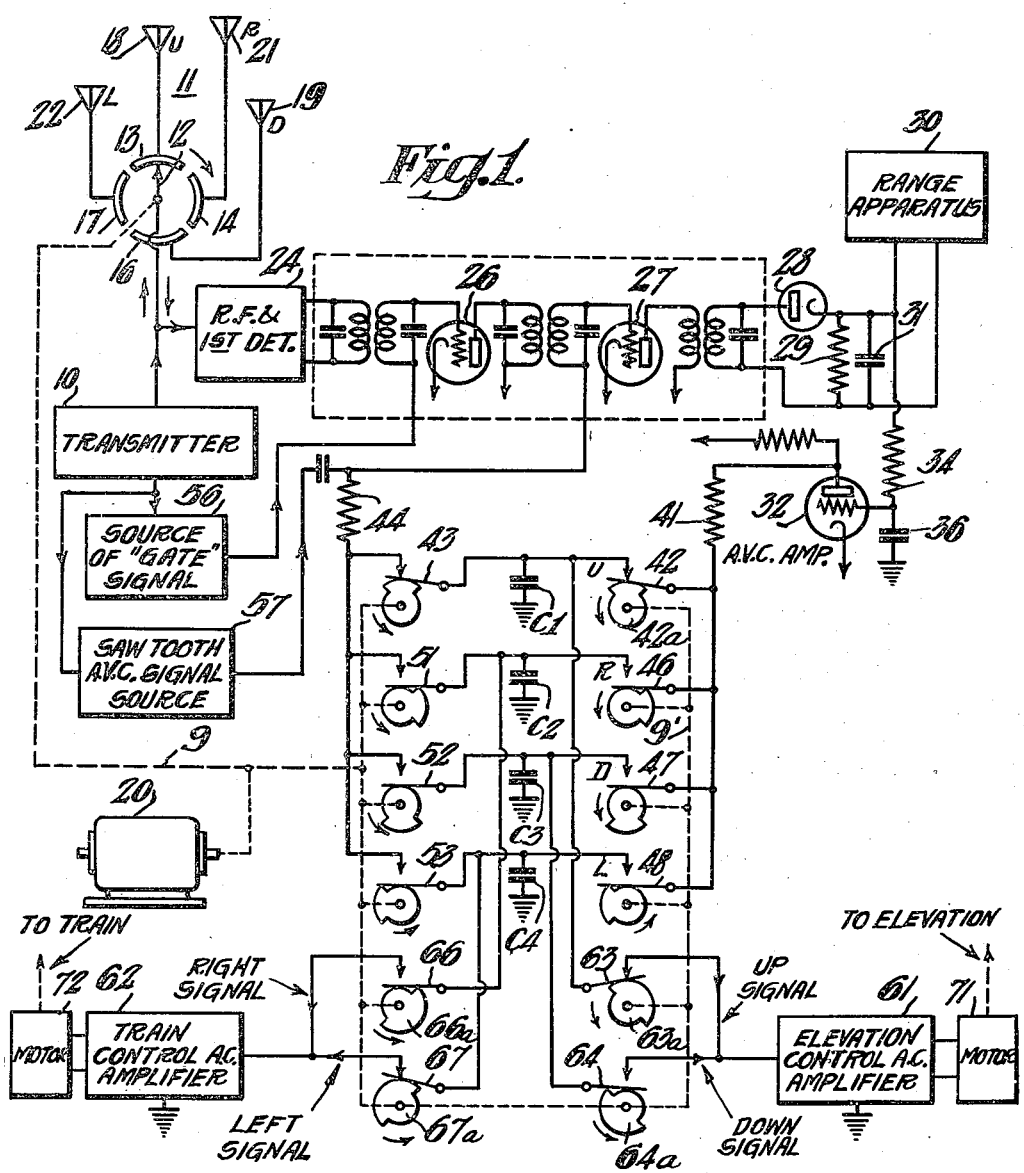

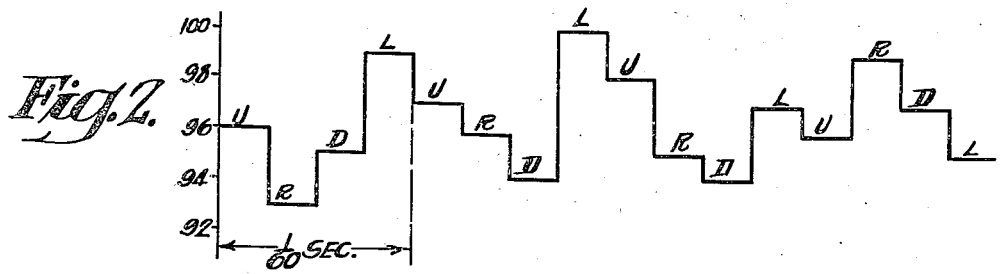
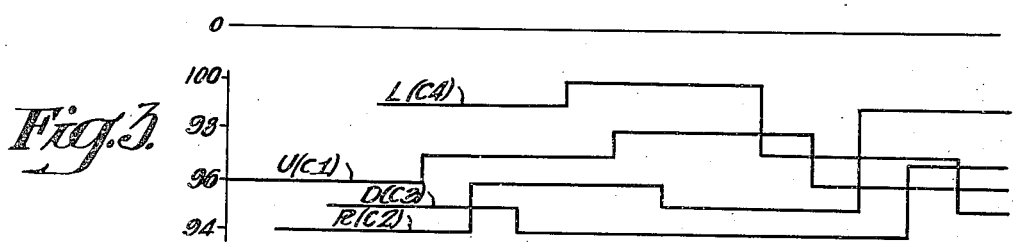
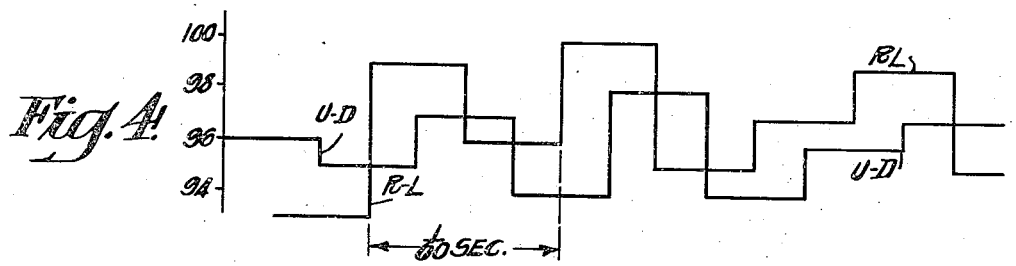
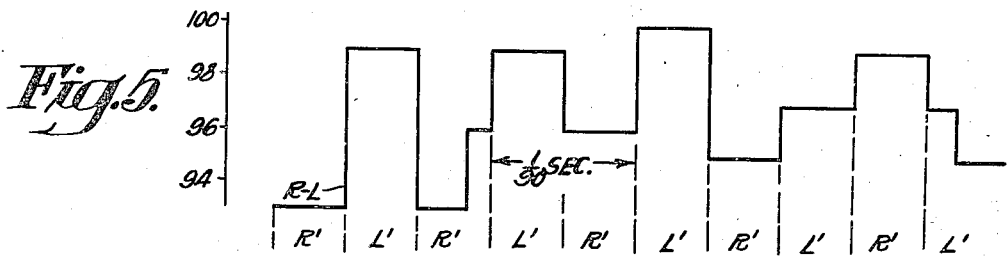

Patented June 17, 1947

2,422,334

UNITED STATES PATENT OFFICE 2,422,334

AUTOMATIC GAIN CONTROL FOR PULSE-ECHO SYSTEMS

Alda V. Bedford, Princeton, N. J., assignor to Radio Corporation of America, a corporation of Delaware Application January 23, 1943, Serial No. 473,411

7 Claims. (Cl. 250—1.54)

My invention relates to object locating systems and particularly to a method of and means for controlling the gain of a receiver in a system wherein a pulse or other signal is transmitted to the object to be located and wherein the signal is reflected from the object back to the receiver.

The invention will be described particularly with reference to a radio locator pulse-echo system wherein a directive antenna system having a plurality of overlapping directional radiation patterns is movably mounted so that it may be directed at a target or other reflecting object. In the example described, the directive antenna system is utilized for both transmission and reception, although either the transmitter antenna or the receiver antenna alone may be directive if preferred. Also, in this example of the invention, the antenna radiation patterns may be rotated both in a horizontal plane and in a vertical plane to search for an object such as an enemy airplane. Four directive antennas are switched in sequence whereby they radiate pulses in radiation patterns slightly displaced up, to the right, down, and to the left from the mean axis of the antenna assembly. In the particular example which will be described for the purpose of illustration, this switching cycle occurs sixty times per second. Thus the received signal contains a step-like modulation with the amplitude of each of the four "steps" depending upon the relative positions of the antenna radiation patterns and the target during the four switching intervals, respectively.

The distance or range to the reflecting object is determined by measuring the time which elapses between the transmission of a pulse and the reception of the pulse after reflection. Unless the antenna system is pointed almost directly at the reflecting object, the reflected pulses which are received during one of the switching intervals will differ considerably in amplitude from those received during the other switching intervals. Therefore, the range finding portion of the system has heretofore operated under conditions resembling fast and rather violent fading whether there actually was any fading of the signal or not. Operation under these conditions is undesirable both because of the usual difficulties resulting from fading and because of the fact that the elevation and train apparatus depend in turn upon correct operation of the range finder since the range finder apparatus controls a "masking" signal that keys off the receiver except during the presence of a "gate" signal in the time region of the return of each reflected pulse.

An object of the invention is to provide a method of and means for improving the operation of the range finding apparatus in an object locating system.

A further object of the invention is to provide an improved object locating system of the type which utilizes the reflection of waves or pulses from the object to be located.

A still further object of the invention is to provide an improved method of and means for controlling the gain in the receiver of an object locator system of the pulse-echo type.

A still further object of the invention is to provide an improved fast-acting automatic gain control system for the range finding apparatus of a radio locator system.

In one preferred embodiment of the invention a radio pulse transmitter is switched successively to a directive antenna assembly for radiating pulses upward, to the right, down, and to the left whereby the reflected signal has an amplitude corresponding to the position of its radiation pattern relative to the target during the corresponding switching interval. Four capacitors are provided which are connected periodically to the receiver output circuit in synchronism with the antenna switching, one capacitor receiving a charge during one switching interval and another capacitor receiving a charge during another switching interval. Each of the capacitors holds its charge until its switch again closes, at which time the charge is altered if the amplitude of the signal for this switching interval has changed.

The four capacitors are also switched synchronously to automatic gain control connections for the receiver amplifier so that the amplifier gain is changed at the switching interval rate to hold the receiver output substantially constant.

The elevation control circuit is controlled by switching it alternately to the two capacitors that receive their charges during the "up" and "down" intervals, respectively. Similarly, the train or azimuth control circuit is controlled by switching it alternately to the two capacitors that receive their charges during the "right" and "left" intervals, respectively.

The invention will be better understood from the following description taken in connection with the accompanying drawing in which Figure 1 is a circuit and block diagram of one embodiment of the invention, Figure 2 is a graph illustrating the character of the signal that is received by the receiver of Fig. 1, Figure 3 is a group of graphs showing the character of the charges on the four above-mentioned capacitors of Fig. 1 during operation of the system, Figure 4 is a group of graphs showing the character of the signals applied to the elevation and train control apparatus, and Figure 5 is a graph which is referred to in explaining another embodiment of the invention.

In the several figures similar parts are indicated by similar reference characters.

In Fg. 1 the radio locator system comprises a radio pulse transmitter 10 whch supplies pulses of radio frequency energy to an antenna assembly 11 through a rotable switch arm 12 and through four commutator segments 13, 14, 16 and 17. The switch arm 12 is rotated by a motor 20 which is mechanically coupled thereto as indicated by the broken line 9. The radio pulses may recur at a rate of about four kilocycles per second, for example, and preferably have a duration of only a few microseconds. The antenna assembly comprises four directive antennas 18, 19, 21 and 22 for radiating pulses of radio frequency energy upward, downward, to the right, and to the left, respectively, with respect to a central common axis as indicated by the letters U, D, R and L. The antenna system, which is indicated only schematically in the drawing, may consist of four directive antennas that may be keyed successively as described for example in Patent No. 2,412,702, issued on December 17, 1946, in the name of Irving Wolff and entitled Object detection and location, or an antenna system may be employed which is keyed by means of shorting capacitors as described and claimed in Patent No. 2,400,736, issued on May 21, 1946, in the name of George H. Brown and entitled Antenna systems. It will be understood that the radiation patterns for these antennas preferably are overlapping conical patterns and that the antenna radiation is greatest at the center and weakens toward the edges of the cones.

The reflection signal is picked up by the directive antenna system 11 and is supplied through the rotating switch arm 12 to the first detector and signal channel selecting portion 24 of a superheterodyne receiver. If the antenna system is pointed to the right of and below the target, the signal will have the "step" modulation as shown in Fig. 2. The intermediate frequency signal is amplified by I.-F. amplifier tubes 26 and 27 and is then supplied to a second detector comprising a diode 28 having the usual output resistor 29 shunted by a capacitor 31. There will appear across the output resistor 29 the demodulated signal consisting of narrow 4-kc. pulses having step-like variations in peak amplitudes corresponding to up, right, down, left. These pulses are applied to the range finding or distance measuring apparatus 30. It will be understood that both the reflected pulses and direct pulses from the transmitter are applied to the range apparatus 30 for measuring the pulse propagation time in any suitable manner as by means of a cathode ray tube indicator.

In accordance with the present invention the second detector output is also applied to an amplifier tube 32 through a suitable filter 34—36 for filtering out the 4-kc. pulses. The signal appearing on the grid of tube 32 is shown in Fig. 2. The output of amplifier tube 32 may be applied through a resistor 41 to a cam operated switch 42 which is closed periodically to apply a charging potential to a capacitor C1. The cam 42a for operating switch 42 is driven by the motor 20 as indicated by the broken line 9' and it is driven in synchronism with the switch arm 12 of the antenna switch. The switch arm 12 and the switch 42 are so phased that during the interval of transmission and reception of the "up" group of pulses the switch 42 is closed whereby a charging current may be applied to the capacitor C1. The high potential side of capacitor C1 is connected through a cam operated switch 43 and a resistor 44 to the input circuit of one or more I.-F. amplifier tubes for controlling their gain in accordance with the charge on the capacitor C1. In the circuit illustrated, this connection is to the grid of the tube 27.

It will be seen that the capacitor C1 receives a charge only during the "up" interval and that it holds this charge until the next "up" interval occurs. This is illustrated by the graph U (C1) of Fig. 3. At this time the charge of the condenser C1 is changed immediately to a new value if there has been a change in the amplitude or voltage level of the signal during the "up" interval.

Similarly, capacitors C2, C3 and C4 receive charges through cam operated switches 46, 47 and 48, respectively, during the "right," "down" and "left" intervals, respectively, to charge these capacitors to their respective voltages shown in Fig. 3 by the graphs R(C2), D(C3) and L(C4). Also, the voltages across capacitors C2, C3 and C4 are applied through switches 51, 52 and 53, respectively, to the I.-F. amplifier during the "right," "down" and "left" intervals, respectively, to control its gain. The direction of rotation of the switch arm 12 and of the cams for operating the several switches is indicated by the arrows. It will be apparent that the gain of the I.-F. amplifier tube 27 is controlled during each switching interval by the voltage level of the signal being received during that switching interval and that the time constant of this gain control circuit may be made fast enough to remove most of the U, R, D, L switching modulation. The amount of modulation remaining is only the amount required for the operation of the automatic gain control circuit and depends upon the flatness of the automatic gain control characteristic. As a result, the operation of the range apparatus is substantially independent of the changes in signal amplitude that are introduced by the antenna switching.

In Fig. 1 the source of the "gate" pulse previously referred to is represented by the block 56. This pulse may be produced in a well known way by widening the pulses from the transmitter and by providing suitable means to shift their phase.

It should be understood that additional automatic gain control voltage may be applied to the I.-F. amplifier if desired. For example, a source of cyclic A. V. C., indicated at 57, may be provided to make the receiver comparatively insensitive to the transmitted pulses and to pulses reflected from a nearby surface. An A. V. C. system of this type is described and claimed in application Serial No. 267,475, filed April 12, 1939, in the name of Rogers M. Smith and entitled Radio echo distance measuring devices.

The elevation control amplifier and the train control amplifier are represented by the blocks 61 and 62, respectively. The elevation amplifier 61 has applied to it alternately the voltages of capacitors C1 and C3, this applied voltage being shown by the graph U—D in Fig. 4. These capacitor voltages are applied through cam operated switches 63 and 64 which are closed alternately by the cams 63a and 64a which may be driven synchronously with the other cam operated switches. Similarly the train control apparatus 62 has applied to it alternately the voltages of capacitors C2 and C4, this applied voltage being shown by the graph R—L in Fig. 4. These capacitor voltages are applied through switches 66 and 67 which may be operated synchronously with the other cam operated switches by means of cams 66a and 67a. Motors represented by the blocks 71 and 72 are driven by the control amplifiers 61 and 62, respectively.

Various control circuits may be employed for elevation and train control. In the example illustrated, the amplifiers 61 and 62 are alternating-current amplifiers tuned to 60 cycles and the motors 71 and 72 are reversible 60-cycle alternating-current motors which are supplied with a synchronous 60-cycle field. The operation is based on the fact that the voltage applied to the amplifiers (voltage U—D, Fig. 4, for example) consists mainly of a 60-cycle component which reverses in phase if the voltage during a switching interval becomes greater than instead of less than the voltage during the other switching interval. For example, referring to Fig. 2, if the voltage during the interval D becomes greater than the voltage during the interval U, then the phase of the 60-cycle component of the voltage U—D (Fig. 4) will reverse and the motor 71 will reverse. This method of elevation and train control is described and claimed in my application Serial No. 462,644, filed October 19, 1942, and entitled Pulse-echo control system.

My improved automatic gain control system will give much better results than an automatic gain control system of the usual type employing the usual R.-C. filter having no switching. This is because the usual system would not effectively remove the 60-cycle modulation unless the filtering was very slight. In my system I provide a comparatively large amount of filtering since the usual A. V. C. filter is replaced by the resistor 41 and by that one of the capacitors C1, C2, C3 and C4 which is connected to the resistor 41 during the particular switching interval.

While synchronous operation of the elevation and train control switching has been described, such operation is not necessary. Since the voltages across the capacitors C1, C2, C3 and C4 contain no signal of the frequency of the antenna commutator switch 12, the switches 63, 64, 66 and 67 need not be driven synchronously with the other switches. Such non-synchronous operation is illustrated in Fig. 5 where the graph R—L represents the voltage applied to the train control amplifier 62 during such non-synchronous operation where the switching cycle recurs at the rate of 90 per second. This type of operation may be useful in case it is desired to change the antenna keying speed frequently in order to reduce the effectiveness of enemy interference. A dominating 90-cycle-per-second component can be seen in the example of Fig. 5 in the first three cycles of the wave. After this, the phase of the 90-cycle component changes 180 degrees in accordance with the signal of Fig. 2. This phase reversal causes the motor to reverse. It will be understood that in this example the motor is supplied with a synchronous 90-cycle-per-second field.

I claim as my invention:

1. An object locating system including means for receiving successively in two directions, an automatic gain control circuit which includes a pair of capacitors and means for charging said capacitors in accordance with the amplitude or intensity of the signals received from said directions, respectively, and means for controlling the gain of said receiving means successively in accordance with the charges on said capacitors.

2. A pulse-echo system comprising a transmitter and a receiver for the transmission and reception of periodically recurring groups of radio pulses, an assembly of directive antennas having overlapping radiation patterns, means for switching said antennas successively to said system, said receiver including an amplifier for amplifying the groups of pulses received during each antenna switching period, means for obtaining a signal having voltage levels which are a measure of the amplitude of the groups of reflected pulses, respectively, an automatic gain control circuit including capacitors for storing energy in each in accordance with said voltage levels, respectively, switching means operated in synchronism with said antenna switching for applying said signal during its occurence at said voltage levels, respectively, to said storage capacitors, respectively, and circuit connections for applying successively the voltages of said storage capacitors to said amplifier to control its gain.

3. The invention according to claim 2 wherein the system includes control apparatus for changing the direction of said antenna radiation patterns, and means for applying alternately to said control apparatus the voltages appearing across a pair of said capacitors whereby the direction of said radiation patterns is controlled in accordance with the relative amplitudes of the voltages from said pair of capacitors.

4. The invention according to claim 2 wherein the system includes means for measuring the time between the transmission and reception of each of said pulses whereby the range to a reflecting object may be determined, said last means being supplied with signal from said amplifier.

5. A pulse-echo system comprising a transmitter and a receiver for the transmission and reception of periodically recurring groups of radio pulses, an assembly of directive antennas having overlapping radiation patterns, means for switching said antennas successively to said system, said receiver including an amplifier for amplifying the groups of pulses received during each antenna switching period, means for obtaining a signal having voltage levels which are a measure of the amplitude of the groups of reflected pulses, respectively, an automatic gain control circuit including capacitors for storing energy in each in accordance with said voltage levels, respectively, switching means operated in synchronism with said antenna switching for applying said signal during its occurrence at said voltage levels, respectively, to said storage capacitors, respectively, circuit connections for applying successively the voltages of said storage capacitors to said amplifier to control its gain, control apparatus for changing the direction of said antenna radiation patterns, means for applying alternately to said control apparatus the voltages appearing across a pair of said capacitors whereby the direction of said radiation patterns is controlled in accordance with the relative amplitudes of the voltages from said pair of capacitors, and means for measuring the time between transmission and reception of each of said pulses whereby the range to a reflecting object may be determined, said last means being supplied with signal from said amplifier.

6. An object locating system comprising a transmitter for the transmission of radio waves to said object and a receiver for the reception of said radio waves after reflection from said object, an assembly of directive antennas having a pair of radiation patterns, means for switching said antennas successively to said system to cause them to function with one radiation pattern during one switching interval and to function with the other radiation pattern during another switching interval, said receiver including an amplifier for amplifying said radio waves, means for obtaining a signal having voltage levels which are a measure of the amplitude of the reflected waves which are received during said switching intervals, respectively, an automatic gain control circuit including a pair of capacitors for storing energy in accordance with said voltage levels, respectively, switching means operated in synchronism with said antenna switching for applying said signal during its occurrence at said voltage levels, respectively, to said storage capacitors, respectively, and circuit connections for applying successively the voltages of said storage capacitors to said amplifier to control its gain.

7. An object locating system comprising a transmitter and a receiver for the transmission of radio waves to said object and for the reception of said waves from said object after reflection, said receiver including an amplifier for amplifying said radio waves, an asesmbly of directive antennas having a pair of radiation patterns in the horizontal plane and having a pair of radiation patterns in the vertical plane, means for switching said antennas successively to said system to radiate radio waves during successive switching intervals, means for obtaining a signal having two voltage levels which are a measure of the amplitude of the reflected waves during said switching intervals, respectively, in the horizontal plane for utilization in control or indication circuits, means for obtaining a signal having two voltage levels which are a measure of the amplitude of the reflected waves during said switching intervals, respectively, in the vertical plane for utilization in control or indication circuits, an automatic gain control circuit which includes four capacitors for storing energy in accordance with said four voltage levels, respectively, switching means operated in synchronism with said antenna switching for applying said signals during its occurrence at each of said four voltage levels to said four capacitors, respectively, and circuit connections for applying the voltages of said storage capacitors to said amplifier to control its gain.

ALDA V. BEDFORD.

REFERENCES CITED

The following references are of record in the file of this patent:

UNITED STATES PATENTS

| Number | Name | Date |
|---|---|---|
| 2,059,081 | Beers | Oct. 27, 1936 |

FOREIGN PATENTS

| Number | Country | Date |
|---|---|---|
| 526,658 | Great Britain | Sept. 23, 1940 |